United States Patent [19]
Baum et al.

[11] 3,714,294
[45] Jan. 30, 1973

[54] CHEMICALLY THICKENED POLYESTER RESIN

[75] Inventors: Melvin E. Baum, Monroeville, Pa.; John A. Hatton, Jr., Madeira, Ohio

[73] Assignee: Koppers Company, Inc.

[22] Filed: Sept. 3, 1971

[21] Appl. No.: 177,780

Related U.S. Application Data

[62] Division of Ser. No. 28,600, April 15, 1970, Pat. No. 3,637,911.

[52] U.S. Cl. .................. 260/865, 161/195, 161/233, 260/40 R
[51] Int. Cl. ............................................. C08f 43/02
[58] Field of Search ........................... 260/865, 40 R

[56] References Cited

UNITED STATES PATENTS

| | | | |
|---|---|---|---|
| 3,219,604 | 11/1965 | Fischer | 260/22 |
| 3,390,205 | 6/1968 | Schnell et al. | 260/865 |
| 3,431,320 | 3/1969 | Baum et al. | 260/865 |
| 3,536,642 | 10/1970 | Williger | 260/22 |

Primary Examiner—William H. Short
Assistant Examiner—E. Nielsen
Attorney—Oscar B. Brumback et al.

[57] ABSTRACT

The viscosity of unsaturated polyester resins formed by mixing the condensation polymers of unsaturated dicarboxylic acids and dihydric alcohols in ethylenically unsaturated copolymerizable monomers may be greatly increased by adding (1) a mixture of calcium oxide and either calcium hydroxide or magnesium oxide, and (2) an organic acid selected from the group consisting of benzoic acid, cyclohexane carboxylic acid, cinnamic acid and p-hydroxybenzoic acid to the unsaturated polyester resins.

The viscosity of the composition is initially low enough so that fibrous reinforcements can be impregnated with the resin composition and the low viscosity permits the resin to wet the fibers, thereafter the viscosity of the resin increases and the fibrous reinforced mass loses its tackiness and can be easily stored and handled.

5 Claims, 2 Drawing Figures

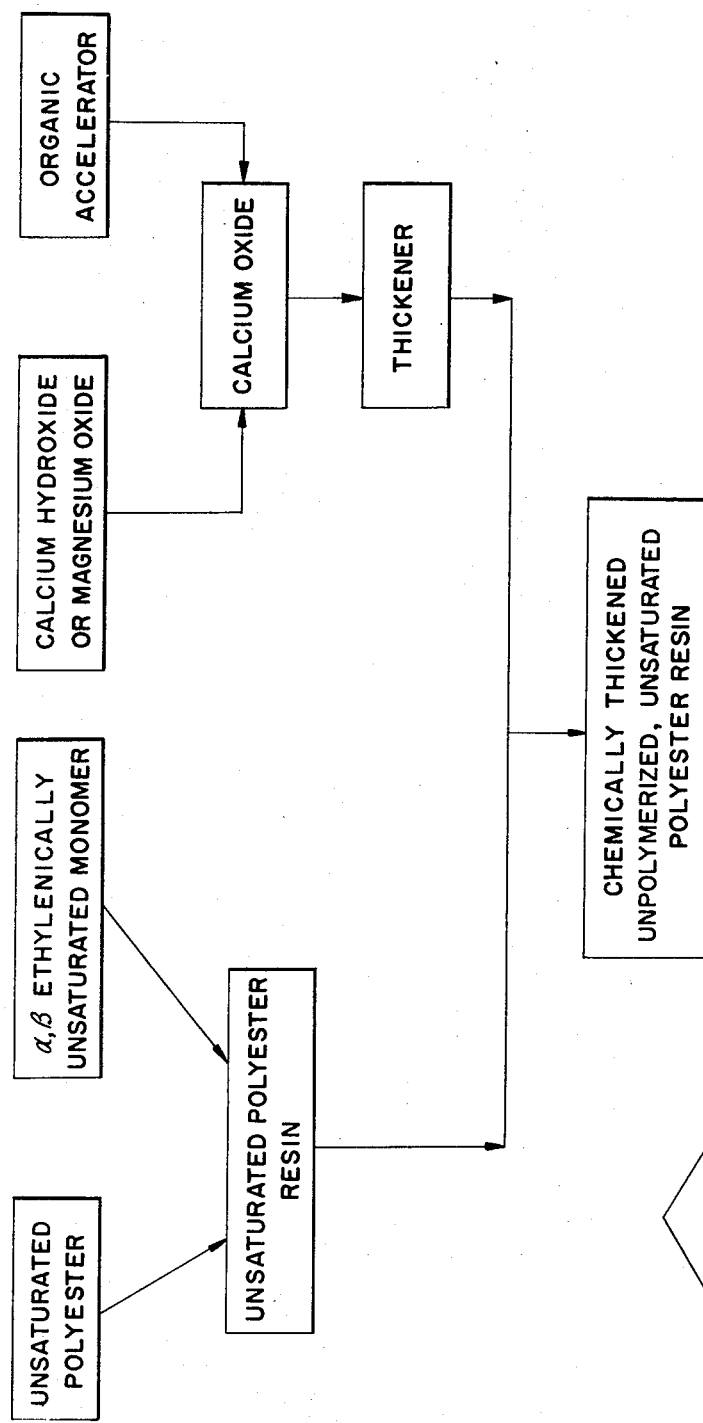

CHEMICALLY THICKENED POLYESTER RESIN

This is a division, of application Ser. No. 28,600, filed Apr. 15, 1970, now U.S. Pat. No. 3,637,911.

BACKGROUND OF THE INVENTION

This invention relates in general to polyester resin compositions having a thickening agent therein.

United States Letters Pat. No. 3,219,604, "Polyester Resin Composition Modified by Monocarboxylic Acid and Metallic Bridging Agent," describes that polyester resin compositions can be thickened by heating the resins with either magnesium oxide, aluminum oxide or calcium oxide and an aliphatic monocarboxylic acid having from 6 to 24 or more carbon atoms in the chain to a temperature of 140° to 250°F. for a period of from 5 minutes to 40 hours so long as a large quantity of inhibitor is present to prevent polymerization. An inherent tendency, of course, is for the polyester resin to partially cure to a gel state at elevated temperatures.

U. S. Pat. No. 3,465,061, "Unsaturated Polyester Resin Compositions Having a Thickening Agent Therein," describes a product which is initially thin but within a day becomes thick, without the application of heat, formed by adding to an unsaturated polyester resin an oxide of a Group II-A metal and an anhydride of a cyclic hydrocarbon. According to U.S. Pat. No. 3,465,061, maleic anhydride and phthalic acid are not particularly effective for thickening the polyester resin; the anhydrides of cyclic hydrocarbons must be used.

There are some other thickening systems that do not require the application of heat to produce the thickening effect. U. S. Pat. No. 3,431,320, "Polyester Resin Composition Having a Thickening Agent Therein" describes that the chemical thickening of polyester resins by the addition of $Ca(OH)_2$ or $MgO$ can be greatly enhanced by the addition of $CaO$. According to U.S. Pat. No. 3,431,320, despite a rapid high viscosity build-up, the pot life of the resin can be extended. This finding enabled sheets to be made, for example, such as fibrous mats impregnated with the polyester resin wherein the resin thickened to yield sheets which were capable of being stacked, with release agents therebetween, for a period of time without the sheets flowing, i.e., changing dimensions an undesirable amount or the glass fibers separating from the resin.

SUMMARY OF THE INVENTION

It has now been discovered that the thickening effect described in U.S. Pat. No. 3,431,320 can be greatly accelerated by the addition of certain monocarboxylic acids, each having a six carbon ring member in its structure, to the unsaturated polyester resin containing a mixture of calcium hydroxide or magnesium oxide and calcium oxide. The thickening is accelerated without the application of heat to the composition and, therefore, large amounts of polymerization inhibitors do not have to be added to the composition to prevent premature curing to a gelation state.

DESCRIPTION OF THE DRAWINGS

FIG. 1 illustrates generally in the block diagram the resinous composition.

FIG. 2 illustrates a layer made in accordance with an embodiment of the invention.

DETAILED DESCRIPTION OF THE INVENTION

In accordance with the invention a resin composition which greatly increases in viscosity is produced from an unsaturated polyester resin which includes an unsaturated polyester formed by condensing at least one dicarboxylic acid containing $\alpha,\beta$-ethylenic unsaturation with a dihydric alcohol and an $\alpha,\beta$-ethylenically unsaturated copolymerizable monomer, preferably a styrene or vinyl-type monomer, by the addition to the resin of a thickening agent in an amount sufficient to increase the viscosity of the composition after a period of time, said thickening agent consisting of a mixture of (1) calcium oxide $CaO$ and (2) either calcium hydroxide $Ca(OH)_2$ or magnesium oxide $MgO$ and an effective amount of a monocarboxylic acid having a six carbon ring member in its structure and selected from the group consisting of:

benzoic acid 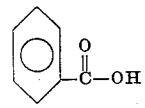

cyclohexane carboxylic acid 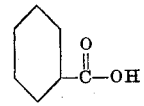

cinnamic acid 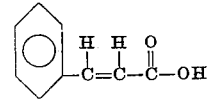

and p-hydroxybenzoic acid 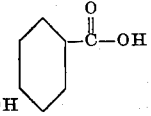

The amount of the calcium oxide, calcium hydroxide and magnesium oxide added to the unsaturated polyester resin may vary somewhat depending upon the amount of viscosity build-up desired. It has been found, however, that at least 0.5 percent by weight of calcium oxide based on the total weight of the polyester resin must be present. It has also been found that the magnesium oxide or calcium hydroxide must be present in an amount by weight of at least 0.5 percent based on the weight of the polyester resin. Larger amounts of calcium oxide, calcium hydroxide or magnesium oxide may be used; the large amounts act more as fillers and are unnecessary to produce the rapid chemical thickening when the organic accelerators are used in accordance with this invention. Amounts of the monocarboxlyic acids as low as 0.25 percent by weight based on the weight of the polyester resin are effective in producing the thickening accelerating effect of the invention. Generally, amounts of from 0.5 to 2.0 percent by weight of the monocarboxylic acids based on the weight of the polyester resins are used in the practice of the invention. Larger amounts of the monocarboxylic acids also act as fillers and do not justify, on the basis of results, the expense involved.

Unsaturated polyester resins are commercially available from a number of sources. By unsaturated polyester resin is meant a mixture of the polyester and a copolymerizable monomer.

The unsaturated polyester is formed by polyesterifying dicarboxylic acids with dihydric alcohols. Approximately equimolar proportions of the dicarboxylic acids and dihydric alcohols are used. To provide unsaturation within the polyester, at least a portion of the dicarboxylic acids contain ethylenic unsaturation. Maleic and fumaric acids are common examples of ethylenically unsaturated dicarboxylic acids. Mixed with these acids may be dicarboxylic acids that are saturated normal aliphatic acids such as adipic acid, succinic acid, or the like, or that are aromatic dicarboxylic acids such as phthalic acid, isophthalic acid or the like as well as halogenated derivatives of such aromatic acids, for instance, tetrachlorophthalic anhydride.

Illustrative of the dihydric alcohols used for the production of polyesters are ethylene glycol, propylene glycol, 1,2-butanediol, 1,3-butanediol, 1,4-butanediol, diethylene glycol, polypropylene glycol, 2,2-dimethyl-1,3-propanediol, 1,4-cyclohexane dimethanol and adducts or reaction products of alkylene oxides with 2,2'-bis(4-hydroxy phenylene) propane (Bis-phenol A).

To produce the polyester resin, the unsaturated polyester is dissolved in an $\alpha,\beta$-ethylenically unsaturated monomer. The amount of monomer used generally is about 20–70 percent (and preferably 30–60 percent) by weight of the total polyester resin. If the percentage of monomer is too low the viscosity of the final resin will be initially too high for good wetting of the glass fibers and the amount of cross linking of the final product will be small so that characteristics such as deflection temperature and tensile strength are not that which are normally desired. On the other hand, too much monomer may cause an undesirable shrinkage during curing and an undesirable exotherm during curing. Preferably 30–60 percent of monomer by weight is used. The unsaturated polyester resin (polyester and monomer) is then cured by initiating a free radical polymerization between the ethylenically unsaturated monomer and the unsaturated polyester at the $\alpha,\beta$-ethylenic double bonds in the polyester. This copolymerization is commonly initiated by addition of a free radical generating catalyst followed by heating. The polyester and monomer compositions of the polyester resin copolymerize to form a cross-linked thermoset resin.

Illustrative of the copolymerizable ethylenically unsaturated monomers are styrene, $\alpha$-methylstyrene, chlorostyrene, vinyl toluene, divinyl benzene, diallylphthalate, methyl methacrylate and the like.

Examples of the free radical generating catalysts are peroxide catalysts such as benzoyl peroxide, methylethyl ketone peroxide, cumene hydroperoxide, and the like. Other free radical generating catalysts may also be used as, for example: 2,2'-azobisisobutyronitrile. Preferably the catalyst system selected is one which is inactive at room temperature since the invention contemplates a desired use of a thickened, yet unpolymerized resin which retains the flexibility of an uncured resin. In accordance with this invention, the catalyst is generally added after the thickeners have been added to avoid any premature gelation which may result from the heat of mixing.

The compositions of this invention can be readily made from commercially available materials. As an illustration, to obtain 100 parts by weight of the polyester resin, 30–80 parts of an unsaturated polyester made from the condensation reaction of approximately equimolar proportions of the dihydric alcohols and dicarboxylic acids are dissolved in, by difference, 20–70, and preferably, 30–60, parts of one of the $\alpha,\beta$-ethylenically unsaturated monomers, i.e., the resin is the polyester dissolved in the monomer. To the 100 parts by weight of the resin are added a mixture of at least 0.5 parts by weight of calcium oxide and 0.5 parts by weight of either calcium hydroxide or magnesium oxide and an effective amount of a monocarboxylic acid selected from the group consisting of benzoic acid, cyclohexane carboxylic acid, cinnamic acid and p-hydroxybenzoic acid. The mass is mixed with a conventional mixer, for example a Cowles mixer, until the mass is thoroughly mixed, usually a matter of minutes. Then the catalyst is added and mixed into the mass.

Conventional fillers, pigments and mold release agents can be mixed into the polyester resin at anytime during the production of the chemically thickened resin. Generally, however, they are added prior to the addition of the thickener.

In use a layer of the composition to which the thickener, filler, pigment and catalyst have been added is poured onto a film of polyethylene which is moving past the pouring point. A layer of chopped glass is then dropped onto the moving resin-coated film, across the width of the film. Onto another sheet of polyethylene film is poured the resin composition and the sheet flipped over; the resin composition is sufficiently thick to prevent the resin from dripping from the polyethylene film. The second sheet is thus applied to the first sheet in such a manner that the surface of the chopped glass-resin system is in contact with the resin composition surface of the other sheet so as to sandwich the layer of chopped glass between the two layers of resin.

The weight of the glass in the mass of resin and glass fiber is chosen according to the properties desired of the polyester after it has been cured. As the weight of glass is increased the strength of the cured polyester increases. The surface appearance of the cured polyester, however, suffers as the weight of glass in the cured polyester increases. Generally, the glass makes up 15–30 percent of the mass of resin and glass fibers. The sheets are then passed between two pressure rollers with the polyethylene film in contact with the rollers to squeeze the resin layer into the fiber layer to enable the resin to penetrate the chopped glass layer and wet the glass fibers. The viscosity of the resin is initially sufficiently low to wet the glass fibers and to allow the resin layers to blend together. However, the viscosity of the resin composition rapidly increases and the mass of resin and glass fibers loses its tackiness. Accordingly, workmen can remove the polyethylene film and stack the layers of composition and fiber mass after a period of only 1 to 2 days. The individual layers may be removed from the stack at will and placed in a mold for molding in accordance with conventional molding techniques.

The invention will be further understood by referring to the block diagram of FIG. 1 and the following examples.

EXAMPLE 1

To illustrate the practice of this invention aliquots were taken from a commercially available unsaturated polyester resin sold under the trademark KOPLAC Grade 2000 (made by the condensation of 1.0 mole each of maleic anhydride and phthalic anhydride with approximately 2.0 mole of propylene glycol.) The resin was analyzed to contain 40 percent styrene and 60 percent polyester and to have an acid number of about 15.8. To 100 parts of each aliquot was added 3.2 parts of calcium oxide and 2.8 parts of calcium hydroxide and, except for aliquot (1), there was added 0.7 parts of a monocarboxylic acid in accordance with the invention. The viscosities in each case through this specification were measured with a Brookfield Syncrolectric Viscometer (Model LVT up to 2 million centipoise and Model HBT up to 64 million centipoise.) The results are tabulated below:

polyester resin increases. Similar results were obtained with cyclohexane carboxylic acid, cinnamic acid and p-hydroxybenzoic acid. It will be noted that the concentration of monocarboxylic acid used will depend on the accelerating effect desired. Generally, however, sufficient thickening for producing a moldable and stackable layer of the invention is obtained with the amounts of acid set out in Table II. Larger amounts of the monocarboxylic acids tend to act as filler and are not justified from a cost standpoint.

EXAMPLE III

To 100 parts of each of six aliquots of the commercially available KOPLAC Grade 6101 unsaturated

TABLE I

| Aliquot | Acid | Viscosity in cps.×10⁻³ | | | | | |
|---|---|---|---|---|---|---|---|
| | | 1 day | 2 days | 2 weeks | 3 weeks | 2 months | 4 months |
| (1) | None | | 15 | | 85 | 190 | 360 |
| (2) | Benzoic | 2,850 | 3,850 | 4,400 | 5,400 | 6,700 | 15,700 |
| (3) | Cinnamic | 183 | 690 | 500 | 380 | 600 | 1,800 |
| (4) | p-Hydroxybenzoic | 76 | 123 | 215 | 210 | 345 | 470 |
| (5) | Cyclohexane carboxylic | 3,400 | 5,900 | 5,700 | 5,100 | 10,200 | 64,000 |

From the foregoing it is evident that the benzoic acid and cyclohexane carboxylic acid are the most effective in promoting greater thickening. It will be noted, however, that with the calcium hydroxide/calcium oxide thickening agents previously known, all of the monocarboxylic acids set out in the table were effective in accelerating the thickening.

EXAMPLE II

To five aliquots of another commercially available unsaturated polyester resin, KOPLAC Grade 6101 (made by condensing 1.0 mole isophthalic acid and 1.4 mole maleic anhydride with 0.8 mole dipropylene glycol and about 1.7 mole of propylene glycol), analyzed as containing 70 percent polyester and 30 percent styrene, was added enough monomeric styrene to dilute the resin to a 60/40, polyester/styrene, ratio. The acid number of these diluted aliquots was analyzed to be 13.2. To 100 parts of each of the diluted aliquots was added 3.2 parts calcium oxide and 2.9 parts calcium hydroxide and, except for aliquot (1), the specified parts of benzoic acid as set out below:

polyester resin described in Example II (70/30 polyester/styrene ratio and having an acid number of 15.4) were added, as set out below, the specified parts of calcium oxide, calcium hydroxide and, except for aliquots (1) and (2), cyclohexane carboxylic acid.

TABLE III

| Aliquot | Parts cyclohexane carboxylic acid | Parts calcium oxide | Parts calcium hydroxide | Viscosity in cps.×10⁻³ | | | | |
|---|---|---|---|---|---|---|---|---|
| | | | | 1 day | 7 days | 2 weeks | 1 month | 2 months |
| (1) | | 1.0 | 1.00 | 185 | 500 | 920 | 1,500 | 2,350 |
| (2) | | 1.0 | 1.50 | 140 | 380 | 800 | 1,200 | 2,000 |
| (3) | 0.5 | 1.0 | 1.0 | 1.1 | 480 | 1,020 | 1,760 | 4,000 |
| (4) | 0.5 | 1.0 | 1.50 | 215 | 800 | 1,400 | 2,700 | 5,400 |
| (5) | 0.5 | 3.0 | 1.0 | 54.0 | 9,000 | 10,700 | 12,800 | 14,100 |
| (6) | 0.5 | 3.0 | 1.25 | 2,200 | 13,000 | 14,700 | 17,600 | 19,800 |

From the foregoing it is evident that the accelerating effect of the invention can be controlled by varying the amounts of calcium oxide and calcium hydroxide or magnesium oxide added to the unsaturated polyester resin containing an effective amount of the monocarboxylic acid. Generally, however, it is not necessary for the total amount of calcium oxide and calcium hydroxide or magnesium oxide present in the thickened composition to exceed 6 percent by weight to achieve a sufficient rapid viscosity thickening to produce the moldable layers of the invention.

A flexible layer, suitable for matched-die molding was produced from the composition of the invention by adding to 100 parts of a seventh aliquot of the KOPLAC Grade 6101 resin of Example III a mixture of 3.2 parts of calcium oxide and 2.9 parts of calcium hydroxide and 0.75 parts of benzoic acid. After

TABLE II

| Aliquot | Parts benzoic acid | Viscosity in cps.×10⁻³ | | | | | | |
|---|---|---|---|---|---|---|---|---|
| | | 1 day | 7 days | 2 weeks | 1 month | 2 months | 3 months | 4 months |
| (1) | | 440 | 700 | 1,040 | 1,150 | 1,800 | 2,400 | 3,450 |
| (2) | 0.54 | 1,460 | 3,200 | 3,700 | 5,600 | 5,950 | 8,300 | 8,650 |
| (3) | 0.74 | 1,600 | 4,000 | 6,200 | 6,000 | 10,400 | 12,700 | |
| (4) | 1.28 | 4,000 | 10,600 | 13,400 | 19,000 | 21,000 | 29,500 | 31,000 |
| (5) | 1.48 | 3,100 | 13,000 | 14,400 | 16,000 | 29,000 | 29,800 | 41,500 |

Table II illustrates the accelerating effect of benzoic acid on the thickening effect of the previously known calcium hydroxide/calcium oxide thickening agents. It is evident from the table that the accelerating effect increases as the concentration of acid in the unsaturated thoroughly mixing the aliquot, the resin was poured onto a moving sheet of polyethylene film having a width of 24 inches. A layer of strands of one inch length of Owens-Corning Type 415 fiber glass were dropped onto the moving resin-coated film, across the width of the film. The resin was also poured onto a second film of polyethylene and the resin-coated sheet flipped over. The resin is sufficiently thick to prevent the resin from dripping off of the film.

The amount of chopped glass dropped onto the resin-coated film was approximately 20 percent by weight based on the final glass-resin system. The resin composition face of the second film was brought into contact with the glass-resin composition face of the first film and passed between pressure rollers with the polyethylene film in contact with the rollers so that the layers were squeezed to cause the resin to penetrate the layer of chopped glass and wet the glass fibers. Several days later the layer of resin and glass was placed in a matched-die mold and heated to a temperature of 280°–300°F. for approximately 3 minutes. Removed from the mold the cured article had a smooth surface appearance and good hardness.

A layer of the type described above is illustrated in FIG. II. The layer is flexible, moldable, storable and non-tacky within a period of time after formation of the layer.

Thus, the chemically thickened resins of the invention have an initial viscosity low enough to insure proper wetting of glass fibers coated with the resins. The viscosities of the resin greatly increase within a spaced period of time thereafter, whereby mats of the coated glass and fibers lose their tackiness and can be easily handled and stored.

What is claimed is:

1. An unsaturated polyester resin composition which greatly increases in viscosity within a period of time after formation of the composition which comprises:
    a. an unsaturated polyester formed by condensing at least one dicarboxylic acid containing $\alpha,\beta$-ethylenic unsaturation with a dihydric alcohol;
    b. an $\alpha,\beta$-ethylenically unsaturated copolymerizable monomer and;
    c. a thickening agent in an amount sufficient to increase the viscosity of the composition after a period of time, said thickening agent consisting of:
        1. a mixture of at least 0.5 percent by weight based on the weight of the unsaturated polyester resin of calcium oxide and at least 0.5 percent by weight of a compound selected from the class consisting of calcium hydroxide and magnesium oxide, and
        2. cinnamic acid in an amount of from 0.25 percent to 2.0 percent by weight based on the weight of the unsaturated polyester resin.

2. The composition of claim 1 wherein the unsaturated polyester is present in an amount of from 20 to 70 percent by weight based on the total weight of the unsaturated polyester and, -ethylenically unsaturated monomer.

3. The composition of claim 1 wherein the monocarboxylic acid is present in an amount of from 0.25 to 2.0 percent by weight based on the weight of the unsaturated polyester resin.

4. The composition of claim 1 wherein the mixture of the thickening agent includes at least 0.5 percent by weight based on the weight of the polyester resin of calcium oxide and at least 0.5 percent by weight of calcium hydroxide.

5. The composition of claim 1 wherein the mixture of the thickening agent includes based on the weight of the polyester resin at least 0.5 percent of calcium oxide and 0.5 percent of magnesium oxide.

* * * * *